United States Patent
Fujiwara et al.

(10) Patent No.: US 12,322,969 B2
(45) Date of Patent: Jun. 3, 2025

(54) POWER CONVERSION SYSTEM

(71) Applicant: Mitsubishi Electric Corporation, Tokyo (JP)

(72) Inventors: Shuhei Fujiwara, Tokyo (JP); Yoshiyuki Kono, Tokyo (JP); Ryosuke Uda, Tokyo (JP); Takuya Kajiyama, Tokyo (JP); Toshiyuki Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 290 days.

(21) Appl. No.: 18/040,062

(22) PCT Filed: Aug. 21, 2020

(86) PCT No.: PCT/JP2020/031677
§ 371 (c)(1),
(2) Date: Jan. 31, 2023

(87) PCT Pub. No.: WO2022/038780
PCT Pub. Date: Feb. 24, 2022

(65) Prior Publication Data
US 2023/0291327 A1    Sep. 14, 2023

(51) Int. Cl.
*H02J 3/06* (2006.01)
*H02J 3/36* (2006.01)
*H02M 7/483* (2007.01)

(52) U.S. Cl.
CPC .... *H02J 3/06* (2013.01); *H02J 3/36* (2013.01); *H02M 7/4835* (2021.05); *Y02E 60/60* (2013.01)

(58) Field of Classification Search
CPC .. H02J 3/06; H02J 3/36; H02M 7/4535; Y02E 60/60
See application file for complete search history.

(56) References Cited

U.S. PATENT DOCUMENTS 11,196,338 B2 *  12/2021  Beddingfield ...... H02M 7/1557
2018/0159316 A1 *  6/2018  Aramaki ................ H02H 3/08
2020/0350767 A1 * 11/2020  Barupati ............... H02M 7/483

FOREIGN PATENT DOCUMENTS

JP    S59185125 A    10/1984
WO   2019049368 A1   3/2019

OTHER PUBLICATIONS

International Search Report (PCT/ISA/210) with translation and Written Opinion (PCT/ISA/237) mailed on Oct. 27, 2020, by the Japan Patent Office as the International Searching Authority for International Application No. PCT/JP2020/031677. (8 pages).

* cited by examiner

*Primary Examiner* — Gary L Laxton
(74) *Attorney, Agent, or Firm* — Buchanan Ingersoll & Rooney PC

(57) ABSTRACT

A power conversion system includes a plurality of power conversion devices connected to a plurality of AC systems, respectively. The power conversion devices are further connected to a common DC circuit. The power conversion system further includes a start-up device to start up each power conversion device. The start-up device selects an AC system that satisfies a defined condition relating to power supply capability from among the plurality of AC systems based on system information of the plurality of AC systems and starts up a power conversion device connected to the selected AC system.

16 Claims, 9 Drawing Sheets

(a)　　　　　　　　　(b)

POWER CONVERSION SYSTEM

TECHNICAL FIELD

The present disclosure relates to a power conversion system.

BACKGROUND ART

A modular multilevel converter (which will also be referred to as an MMC converter below) in which a plurality of unit converters are cascaded can readily address a higher voltage by increasing the number of unit converters. The "unit converter" is also referred to as a "sub module" or a "converter cell." The MMC converter has widely been applied to power transmission and distribution systems as a high-capacity static var compensator or a power conversion device for high-voltage direct-current (DC) power transmission. Typically, at the time of start-up of the MMC converter, electric power is supplied from an alternating-current (AC) system in order to charge a capacitor within a sub module.

Japanese Patent Laying-Open No. 59-185125 (PTL 1) discloses a method of controlling start-up of an AC-DC conversion device that converts AC output from an AC power system into DC for DC transmission by DC output.

CITATION LIST

Patent Literature

PTL 1: Japanese Patent Laying-Open No. 59-185125

SUMMARY OF INVENTION

Technical Problem

A power conversion system including an MMC power converter is used, for example, as a system to control electric power of a DC power transmission system. Though electric power is typically supplied and received between a plurality of AC systems through a DC circuit, the AC systems may be different in margin of power supply capability. At the time of start-up of a power conversion device, electric power should be supplied from the AC system. Therefore, when a power conversion device connected to an AC system without a margin for power supply capability is started up first, influence on the AC system is great (for example, balance between supply and demand of electric power cannot be maintained). PTL 1 does not teach or suggest a solution to such a problem.

An object in one aspect of the present disclosure is to provide a power conversion system including a plurality of power conversion devices connected to a plurality of AC systems, respectively, where influence on an AC system at the time of start-up of a power conversion device can be minimized.

Solution to Problem

A power conversion system according to one embodiment includes a plurality of power conversion devices connected to a plurality of AC systems, respectively. The power conversion devices are further connected to a common DC circuit. The power conversion system further includes a start-up device to start up each of the power conversion devices. The start-up device selects an AC system that satisfies a defined condition relating to power supply capability from among the plurality of AC systems based on system information of the plurality of AC systems, and starts up a power conversion device connected to the selected AC system.

Advantageous Effects of Invention

According to the present disclosure, in a power conversion system including a plurality of power conversion devices connected to a plurality of AC systems, respectively, influence on an AC system at the time of start-up of a power conversion device can be minimized.

DESCRIPTION OF EMBODIMENTS

Figure 1:
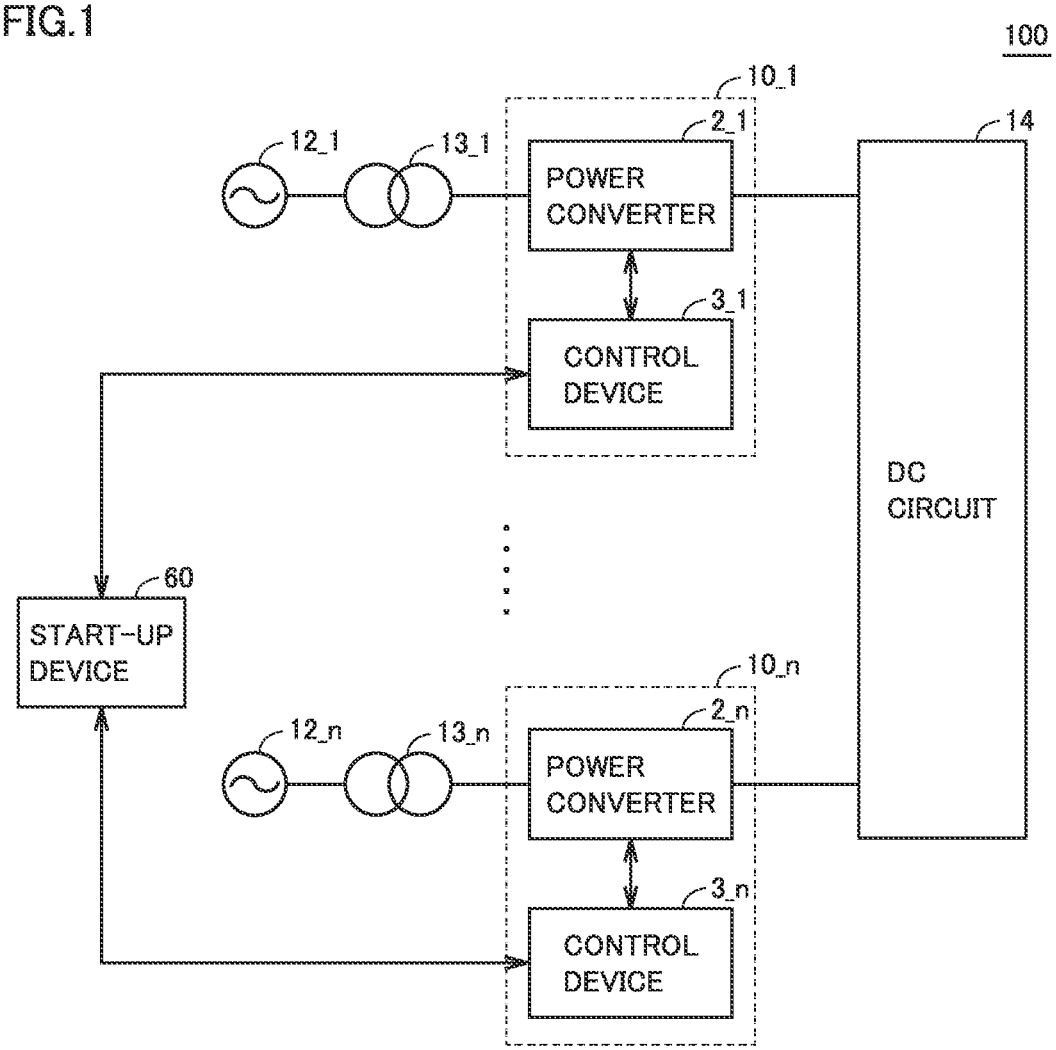
FIG. 1 is a schematic configuration diagram of a power conversion system.

The present embodiment will be described below with reference to the drawings. In the description below, the same elements have the same reference characters allotted and their labels and functions are also the same. Therefore, detailed description thereof will not be repeated.

<Overall Configuration of System>

FIG. 1 is a schematic configuration diagram of a power conversion system 100. Referring to FIG. 1, power conversion system 100 includes power conversion devices 10_1 to 10_n (which are also collectively referred to as a "power conversion device 10" below), AC systems 12_1 to 12_n (which are also collectively referred to as an "AC system 12" below), transformers 13_1 to 13_n (which are also collectively referred to as a "transformer 13" below), and a DC circuit 14. "n" represents an integer not smaller than two. A configuration in which n (n being an integer not smaller than two) systems each including AC system 12, transformer 13, and power conversion device 10 are connected to common DC circuit 14 will be described below. DC circuit 14 is, for example, a DC terminal of a DC power system including a DC power transmission network or another power conversion device.

In power conversion system 100, electric power is transmitted and received among AC system 12_1 to AC system 12_n through DC circuit 14. The plurality of AC systems 12_1 to AC system 12_n are three-phase AC systems different in power supply capability from one another. For example, it is assumed that AC systems 12_1 to 12_n are identical in reference frequency (for example, 50 Hz) and that a system frequency (which is simply referred to as a "frequency" below) measured in AC system 12_1 is higher than a frequency measured in AC system 12_n. In this case, AC system 12_1 higher in frequency is higher in capability to supply effective electric power and higher in capability of supply of electric power (that is, power supply capability) of the AC system than AC system 12_n. Therefore, AC system 12_1 is a system with a larger margin for power supply capability than AC system 12_n.

Power conversion device 10_1 includes a power converter 2_1 to convert electric power between AC system 12_1 and DC circuit 14 and a control device 3_1. Power conversion device 10_n includes a power converter 2_n to convert electric power between AC system 12_n and DC circuit 14 and a control device 3_n. Power conversion devices 10 1 to 10_n are connected to common DC circuit 14. Power converters 2_1 to 2_n are each a self-excited power converter 2 to convert electric power between DC circuit 14 and AC system 12. Typically, power converter 2 is implemented by an MMC conversion power converter including a plurality of sub modules connected in series. Power converter 2 may be adapted to conversion other than MMC conversion. Control devices 3_1 to 3_n control operations of power converters 2_1 to 2_n, respectively. In the description below, power converters 2_1 to 2_n are also collectively referred to as a "power converter 2" and control devices 3_1 to 3_n are also collectively referred to as a "control device 3."

Transformer 13_1 is connected between AC system 12_1 and power converter 2_1. Transformer 13_n is connected between AC system 12_n and power converter 2_n.

When electric power is transmitted from AC system 12_1 to AC system 12_n, power converter 2_1 operates as a rectifier (REC) and power converter 2_n operates as an inverter (INV). Specifically, power converter 2_1 converts AC power to DC power, which is transmitted as DC through DC circuit 14. At a power reception end, power converter 2_n converts DC power to AC power, which is supplied to AC system 12_n through transformer 13_n. When power converter 2_1 operates as the inverter and power converter 2_n operates as the rectifier, a conversion operation reverse to the above is performed.

A start-up device 60 starts up each of power conversion devices 10_1 to 10_n. Specifically, start-up device 60 is configured to communicate with control devices 3_1 to 3_n, and receives system information of AC systems 12_1 to 12_n from control devices 3_1 to 3_n. Start-up device 60 selects an AC system that satisfies a defined condition relating to power supply capability from among a plurality of AC systems 12 based on system information of AC systems 12_1 to 12_n. For example, start-up device 60 selects AC system 12 that satisfies such a defined condition as highest power supply capability (that is, the largest margin) from among the plurality of AC systems 12. It is assumed that AC system 12_1 is selected. In this case, start-up device 60 transmits a start-up command to control device 3_1 in order to start up power converter 2_1 connected to AC system 12_1. Control device 3_1 starts up power converter 2_1 in accordance with the start-up command.

According to the above, since power converter 2_1 is started up first with electric power from AC system 12_1 with a margin in power supply capability, influence on AC system 12_1 can be lessened and balance between supply and demand of electric power can be maintained.

<Configuration of Power Conversion Device>
(Overall Configuration)

Figure 2:
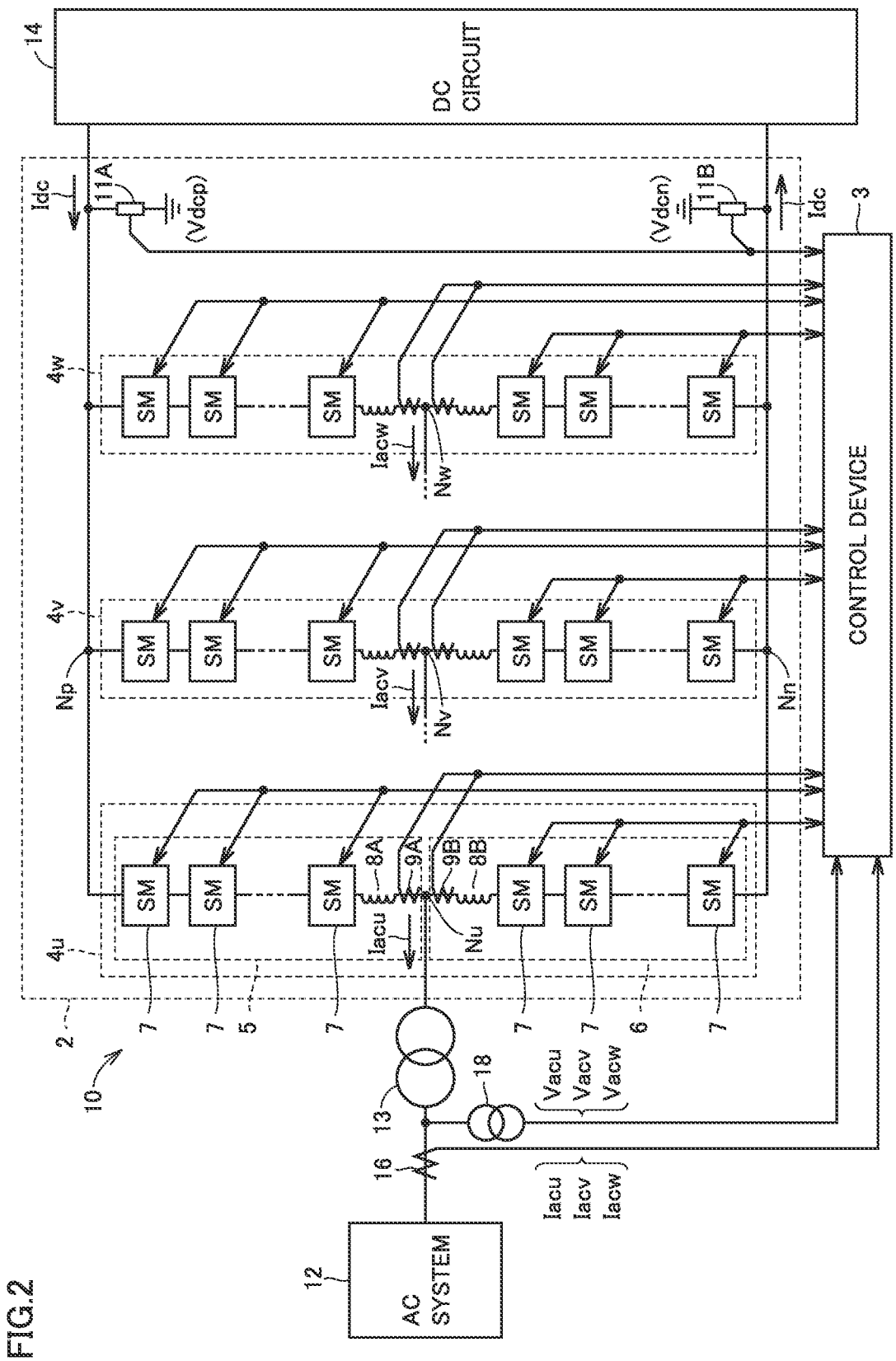
FIG. 2 is a schematic configuration diagram of a power converter.

FIG. 2 is a schematic configuration diagram of power converter 2. Referring to FIG. 2, power converter 2 is configured of a MMC converter which includes multiple sub modules (corresponding to "SM" in FIG. 2) 7 connected in series.

Power converter 2 includes multiple leg circuits 4u, 4v, 4w (will be described as a "leg circuit 4" when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between AC system 12 and DC circuit 14, and converts power between the systems. Power converter 2 is provided with three leg circuits 4u, 4v, 4w corresponding to a U phase, a V phase, and a W phase, respectively.

AC input terminals Nu, Nv, Nw provided for respective leg circuits 4u, 4v, 4w are connected to AC system 12 via transformer 13. For ease of illustration, FIG. 2 does not show connection between AC input terminals Nv, Nw and transformer 13. Positive DC terminal Np and negative DC terminal Nn, which are connected in common to each leg circuit 4, are connected to DC circuit 14.

AC input terminals Nu, Nv, Nw may be connected to AC system 12 via an interconnection reactor, instead of transformer 13 in FIG. 1. Furthermore, instead of AC input terminals Nu, Nv, Nw, a primary winding may be provided for each of leg circuits 4u, 4v, 4w, and leg circuits 4u, 4v, 4w may be connected to transformer 13 or an interconnection reactor in an AC manner via a secondary winding magnetically coupled to the primary winding. In this case, the primary winding may be reactors 8A, 8B described below. In other words, leg circuit 4 is electrically (i.e., a DC manner or an AC manner) connected to AC system 12 via the connector provided for each of leg circuits 4u, 4v, 4w, such as AC input terminals Nu, Nv, Nw or the above primary winding.

Leg circuit 4u is constituted of two arms connected in series. Specifically, leg circuit 4u includes an upper arm 5 from positive DC terminal Np to AC input terminal Nu and a lower arm 6 from negative DC terminal Nn to AC input terminal Nu. AC input terminal Nu, which is the point of connection between upper arm 5 and lower arm 6, is connected to transformer 13. Positive DC terminal Np and negative DC terminal Nn are connected to DC circuit 14. Leg circuits 4v, 4w have the same configuration as leg circuit 4u, and leg circuit 4u will thus be representatively described below.

Upper arm 5 includes multiple cascade-connected sub modules 7 and reactor 8A. Multiple sub modules 7 and reactor 8A are connected in series. Lower arm 6 includes multiple cascade-connected sub modules 7 and reactor 8B. Multiple sub modules 7 and reactor 8B are connected in series.

Detectors for measuring the electrical quantities (for example, current, voltage, etc.) for use in the control are provided in power conversion system 100. The detectors include, for example, an AC voltage detector 18, an AC current detector 16, DC voltage detectors 11A, 11B, arm current detectors 9A, 9B, and the like. Arm current detectors 9A, 9B are provided for each leg circuit 4. Signals detected by these detectors are input to control device 3.

Control device 3 provides an operation command for controlling an operating state of each sub module 7 within power converter 2 based on these detection signals. The operation command is generated in correspondence with each of the upper arm of the U phase, the lower arm of the U phase, the upper arm of the V phase, the lower arm of the V phase, the upper arm of the W phase, and the lower arm of the W phase. Control device 3 receives various types of information from each sub module 7. The various types of information are internal information of sub module 7, and includes a voltage value of a condenser in sub module 7 and state information representing a state of sub module 7. The state information includes information indicating whether sub module 7 is in a normal operation state in which sub module 7 is normally operating or a stop state and information indicating whether or not sub module 7 has failed.

Note that, for ease of illustration, in FIG. 1, some of signal lines for the signals inputted from the detectors to control device 3 and signal lines for the signals inputted/outputted to/from control device 3 and each sub module 7 are depicted collectively, but they are, in practice, provided for each detector and each sub module 7. The signal lines may be provided separately for transmission and reception of the signals between each sub module 7 and control device 3. For example, an optical fiber may be adopted as the signal line.

AC voltage detector 18 detects a U-phase AC voltage Vacu, a V-phase AC voltage Vacv, and a W-phase AC voltage Vacw of AC system 12. AC current detector 16 detects a U-phase AC current Iacu, a V-phase AC current Iacv, and a W-phase AC current Iacw of AC system 12. DC voltage detector 11A detects a DC voltage Vdcp of positive DC terminal Np connected to DC circuit 14. DC voltage detector 11B detects a DC voltage Vdcn of negative DC terminal Nn connected to DC circuit 14. A difference between DC voltage Vdcp and DC voltage Vdcn is defined as a DC voltage Vdc.

Arm current detectors 9A and 9B, included in leg circuit 4u for U phase, respectively detect an arm current Ipu flowing through upper arm 5 and an arm current Inu flowing through lower arm 6. Similarly, arm current detectors 9A and 9B included in leg circuit 4v for V phase detect an arm current Ipv and an arm current Inv, respectively. Arm current detectors 9A and 9B included in leg circuit 4w for W phase detect an arm current Ipw and an arm current Inw, respectively.

(Configuration of Sub Module)

Figure 3:
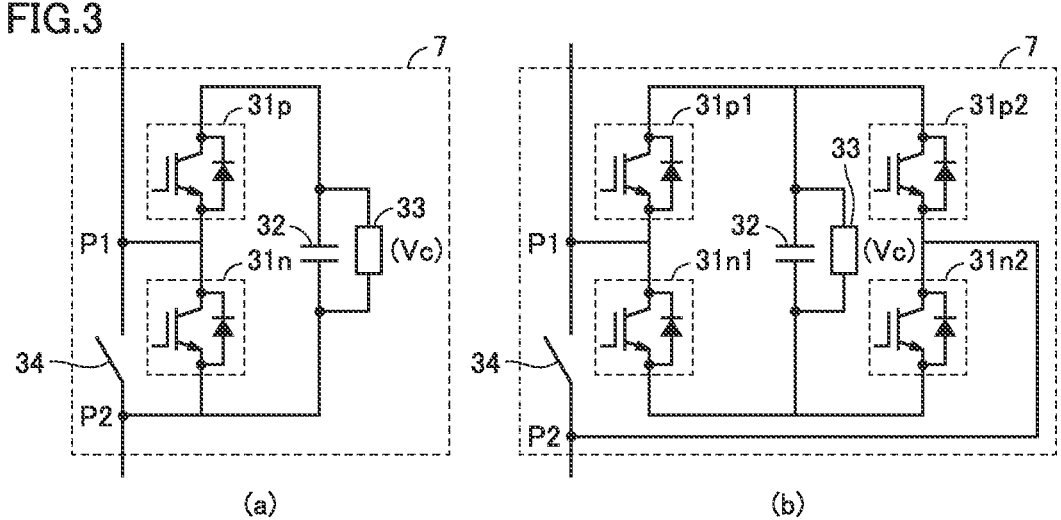
FIG. 3 is a circuit diagram showing an exemplary sub module.

FIG. 3 is a circuit diagram showing an exemplary sub module. Sub module 7 shown in FIG. 3 (a) has a circuit configuration called a half-bridge configuration. This sub module 7 includes a serial body formed by connecting two switching elements 31p and 31n to each other in series, a condenser 32 as an energy storage, a voltage detector 33, and a bypass switch 34. The serial body and condenser 32 are connected in parallel. Voltage detector 33 detects a condenser voltage Vc which is a voltage across ends of condenser 32.

Sub module 7 shown in FIG. 3 (b) has a circuit configuration called a full-bridge configuration. This sub module 7 includes a first serial body formed by connecting two switching elements 31p1 and 31n1 to each other in series, a second serial body formed by connecting two switching elements 31p2 and 31n2 to each other in series, condenser 32, and voltage detector 33. The first serial body, the second serial body, and condenser 32 are connected in parallel. Voltage detector 33 detects condenser voltage Vc.

Two switching elements 31p and 31n in FIG. 3 (a) and four switching elements 31p1, 31n1, 31p2, and 31n2 in FIG. 3 (b) are configured, for example, by connection of a freewheeling diode (FWD) in anti-parallel to a self-arc-extinguishing semiconductor switching element such as an insulated gate bipolar transistor (IGBT), a gate commutated turn-off (GCT) thyristor, and a metal oxide semiconductor field-effect transistor (MOSFET). In FIG. 3 (a) and FIG. 3 (b), a capacitor such as a film condenser is mainly employed as condenser 32.

In the description below, switching elements 31p, 31n, 31p1, 31n1, 31p2, and 31n2 are also collectively referred to as a switching element 31. On and off of a semiconductor switching element within switching element 31 is simply denoted as "on and off of switching element 31."

Referring to FIG. 3 (a), opposing terminals of switching element 31n is defined as input and output terminals P1 and P2. As switching elements 31p and 31n perform a switching operation, a voltage across opposing ends of condenser 32 and a zero voltage are provided. For example, when switching element 31p is turned on and switching element 31n is turned off, the voltage across opposing ends of condenser 32 is provided. When switching element 31p is turned off and switching element 31n is turned on, the zero voltage is provided. Though opposing terminals of switching element 31n are defined as input and output terminals P1 and P2 in FIG. 3 (a), opposing terminals of switching element 31p may be defined as input and output terminals P1 and P2, and in that case, operations are inverted.

Bypass switch 34 is connected between input and output terminals P1 and P2. In FIG. 3 (a), bypass switch 34 is connected in parallel to switching element 31n. When opposing terminals of switching element 31p are defined as input and output terminals P1 and P2, however, bypass switch 34 is connected in parallel to switching element 31p. By turning on bypass switch 34, sub module 7 is short-circuited. Bypass switch 34 is used also for short-circuiting of sub module 7 when each element in sub module 7 fails. Thus, even when any sub module 7 among a plurality of sub modules 7 fails, by using other sub modules 7, power converter 2 can continue operating.

Referring now to FIG. 3 (b), a point intermediate between switching element 31p1 and switching element 31n1 and a point intermediate between switching element 31p2 and switching element 31n2 are defined as input and output terminals P1 and P2 of sub module 7. Sub module 7 shown in FIG. 3 (b) provides a positive voltage or the zero voltage by turning on switching element 31n2, turning off switching element 31p2, and alternately turning on switching elements 31p1 and 31n1. Sub module 7 shown in FIG. 3 (b) can also provide the zero voltage or a negative voltage by turning off switching element 31n2, turning on switching element 31p2, and alternately turning on switching elements 31p1 and 31n1.

Bypass switch 34 is connected between input and output terminals P1 and P2. Bypass switch 34 is connected in parallel to a serial body of switching elements 31n1 and 31n2. By turning on bypass switch 34, sub module 7 is short-circuited.

A sub module in a configuration other than the configuration shown above, such as a sub module to which a circuit configuration also called a 1.5 half-bridge configuration where switching element 31p2 in FIG. 3 (b) is replaced with a diode alone is applied, may be employed.

(Hardware Configuration of Control Device)

Figure 4:
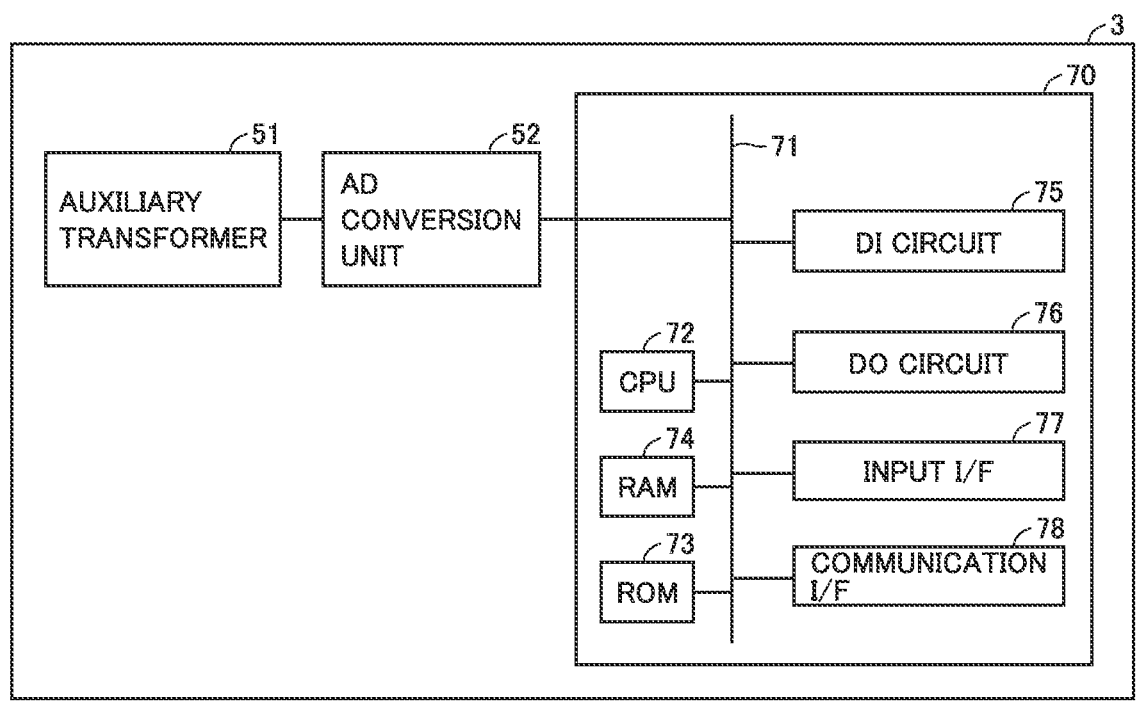
FIG. 4 is a diagram showing an exemplary hardware configuration of a control device.

FIG. 4 is a diagram showing an exemplary hardware configuration of control device 3. Referring to FIG. 4, control device 3 includes an auxiliary transformer 51, an analog to digital (AD) conversion unit 52, and an arithmetic processing unit 70.

Auxiliary transformer 51 takes in an electrical quantity from each detector, converts the electrical quantity to a voltage signal suitable for signal processing in an internal circuit, and outputs the voltage signal. AD conversion unit 52 takes in the voltage signal outputted from auxiliary transformer 51 and converts the voltage signal into digital data. Specifically, AD conversion unit 52 includes an analog filter, a sample-and-hold circuit, a multiplexer, and an AD converter.

The analog filter removes a noise component at a high frequency from the voltage signal provided from auxiliary transformer 51. The sample-and-hold circuit samples a signal provided from the analog filter in predetermined sampling cycles. The multiplexer successively switches, on a time-series basis, signals provided from the sample-and-hold circuit based on a timing signal provided from arithmetic processing unit 70 and provides the signals to the AD converter. The AD converter converts a signal provided from the multiplexer from analog data to digital data. The AD converter outputs a signal resulting from digital conversion (that is, digital data) to arithmetic processing unit 70.

Arithmetic processing unit 70 includes a central processing unit (CPU) 72, a ROM 73, a RAM 74, a digital input (DI) circuit 75, a digital output (DO) circuit 76, an input interface (I/F) 77, and a communication interface (I/F) 78. These components are coupled to one another through a bus 71.

CPU 72 controls operations of control device 3 by reading and executing a program stored in ROM 73. Various types of information to be used by CPU 72 are stored in ROM 73. CPU 72 is implemented, for example, by a microprocessor. Such hardware may be implemented by a field programmable gate array, an application specific integrated circuit (ASIC), and a circuit with other arithmetic functions, other than the CPU.

CPU 72 takes in digital data from AD conversion unit 52 through bus 71. CPU 72 performs control operations with the use of taken-in digital data in accordance with the program stored in ROM 73. CPU 72 outputs a control command to the outside through DO circuit 76 based on a result of control operations. CPU 72 receives a response to the control command through DI circuit 75. Input interface 77 is typically implemented by various buttons and accepts various setting operations from a system operator. CPU 72 transmits and receives various types of information to and from another device (for example, start-up device 60) through communication interface 78.

Start-up device 60 may be similar in hardware configuration, for example, to control device 3. For example, control device 3 and start-up device 60 are each configured as a digital protective control device. Start-up device 60 should only be a computer with an arithmetic function capable of performing information processing which will be described later.

<Start-Up Method>

A method of starting up power converter 2 performed by start-up device 60 will be described. In the present embodiment, start-up device 60 selects AC system 12 that satisfies a defined condition relating to power supply capability from among a plurality of AC systems 12 based on system information of AC systems 12_1 to 12_n and starts up power converter 2 connected to selected AC system 12. A method of selecting AC system 12 that satisfies the defined condition and the method of starting up power converter 2 based on the selection method will be described below.

(Frequency)

An example in which a frequency of AC system 12 is used as system information of AC system 12 will be described. It is assumed that AC systems 12_1 to 12_n are identical in reference frequency. In this case, an AC system higher in current frequency can be concluded as an AC system higher in power supply capability.

It is assumed that start-up device 60 receives a frequency detected in each of AC systems 12_1 to 12_n from each control device 3. Specifically, control device 3 obtains AC voltages Vacu, Vacv, and Vacw detected by AC voltage detector 18 and calculates a frequency of AC system 12. Control device 3 transmits the calculated frequency to start-up device 60.

Figure 5:
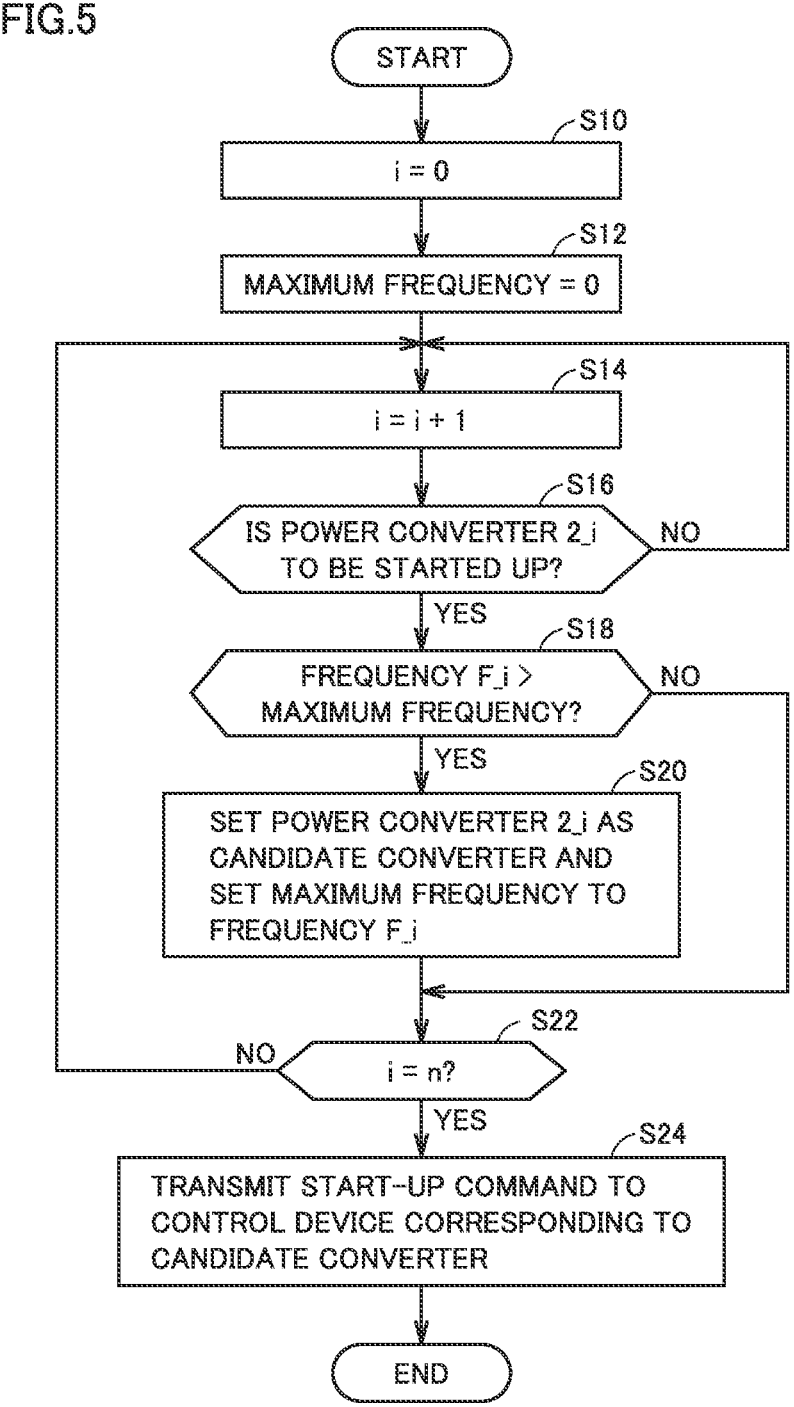
FIG. 5 is a flowchart for illustrating an exemplary method of starting up a power converter based on a frequency of an AC system.

FIG. 5 is a flowchart for illustrating an exemplary method of starting up a power converter based on a frequency of an AC system. Processing in FIG. 5 is performed by the CPU of start-up device 60. This is also applicable to processing in FIGS. 6 to 8 below.

Referring to FIG. 5, start-up device 60 initializes a counter i to i=0 (step S10). Start-up device 60 initializes a maximum frequency of AC system 12 to "0" (step S12). Start-up device 60 increments counter i (step S14) and determines whether or not an ith power converter 2_i is a power converter to be started up (step S16). Specifically, start-up device 60 obtains in advance information on power converter 2 to be started up (for example, a list of start-up targets) from a higher-order device and makes determination based on the information. Power converter 2 to be started up is changed freely by a system operator.

When ith power converter 2_i is not to be started up (NO in step S16), start-up device 60 increments counter i (step S14). Thus, "i+1"th power converter 2 is subjected to processing in step S16.

When ith power converter 2_i is to be started up (YES in step S16), start-up device 60 determines whether or not a frequency F_i of AC system 12_i connected to power converter 2_i is higher than a current maximum frequency (step S18). When frequency F_i is equal to or lower than the current maximum frequency (NO in step S18), start-up device 60 performs step S22 which will be described later. When frequency F_i is higher than the current maximum frequency (YES in step S18), start-up device 60 sets ith power converter 2_i as a power converter to be a start-up candidate (which is also referred to as a "candidate converter" below) and sets the maximum frequency to frequency F_i (step S20).

Start-up device 60 determines whether or not a condition of i=n is satisfied (step S22). Start-up device 60 thus determines whether or not it has performed processing in steps S16 to S20 for all power converters 2_1 to 2_n. When the condition of i=n is not satisfied (NO in step S22), start-up device 60 performs processing in step S14. When the condition of i=n is satisfied (YES in step S22), start-up device 60 transmits a start-up command to control device 3 corresponding to the candidate converter (that is, to control the candidate converter) (step S24) and quits the process.

According to the above, start-up device 60 selects, as AC system 12 that satisfies the defined condition, AC system 12 having the maximum frequency among the plurality of AC systems 12 connected to the plurality of power converters 2 to be started up, respectively. Start-up device 60 transmits the start-up command for starting up power converter 2 connected to selected AC system 12, to control device 3 of that power converter 2. Since power converter 2 connected to AC system 12 highest in power supply capability is thus started up, influence on AC system 12 can be minimized.

(Frequency Ratio)

An example in which a ratio (which is also referred to as a "frequency ratio" below) of a current frequency to a reference frequency of AC system 12 is employed as the system information of AC system 12 will be described. AC systems 12_1 to 12_n may be identical to or different from one another in reference frequency. In this case, an AC system higher in ratio (that is, the frequency ratio) of the current frequency of the AC system to the reference frequency of the AC system can be concluded as the AC system higher in power supply capability.

Start-up device 60 receives the current frequency detected in each of AC systems 12_1 to 12_n and the reference frequency of each of AC systems 12_1 to 12_n from each control device 3. Start-up device 60 calculates the ratio (that is, the frequency ratio) of the current frequency to the reference frequency for each AC system 12. Start-up device 60 may be configured to receive the frequency ratio from each control device 3.

Figure 6:
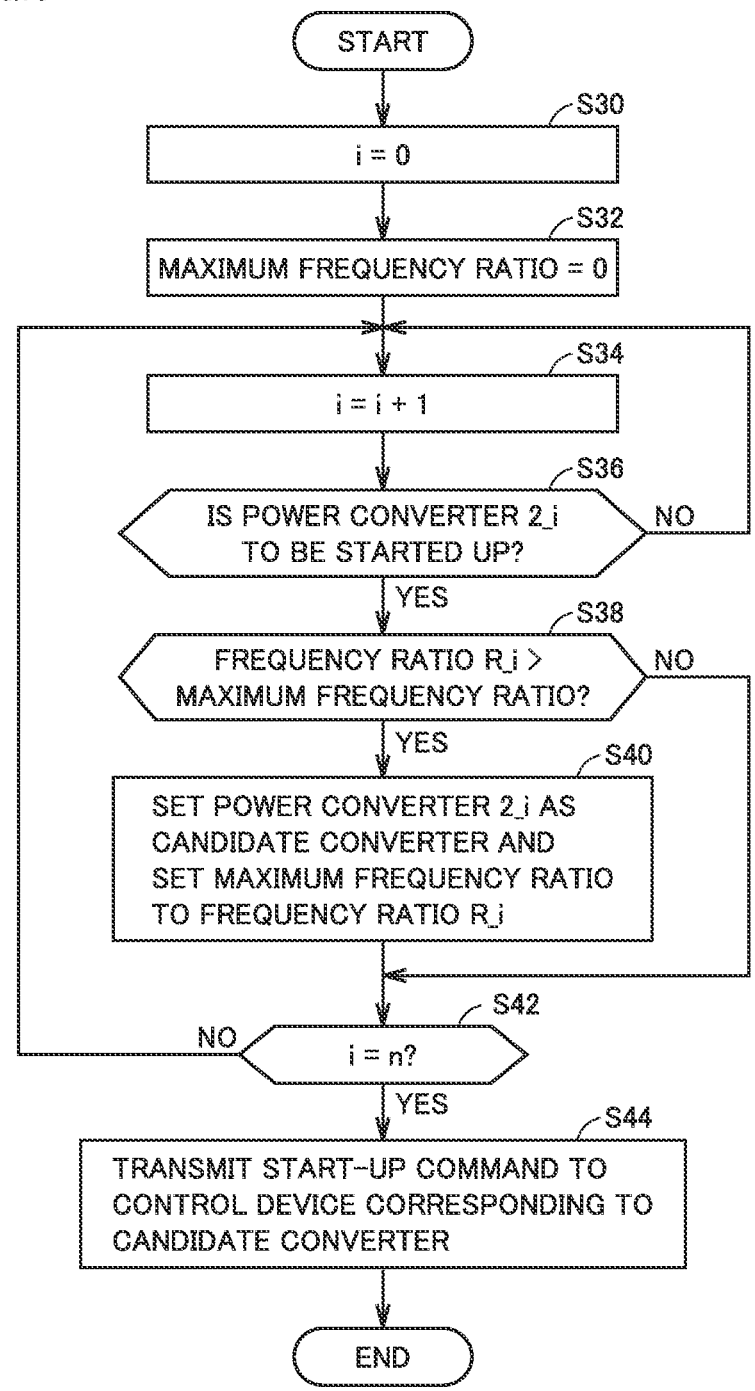
FIG. 6 is a flowchart for illustrating an exemplary method of starting up a power converter based on a frequency ratio of an AC system.

FIG. 6 is a flowchart for illustrating an exemplary method of starting up a power converter based on a frequency ratio of an AC system. Referring to FIG. 6, start-up device 60 initializes counter i to i=0 (step S30). Start-up device 60 initializes a maximum frequency ratio to "0" (step S32).

Start-up device 60 increments counter i (step S34) and determines whether or not ith power converter 2_i is the power converter to be started up (step S36). When power converter 2_i is not to be started up (NO in step S36), start-up device 60 increments counter i (step S34). When power converter 2_i is to be started up (YES in step S36), start-up device 60 determines whether or not a frequency ratio R_i in AC system 12_i connected to power converter 2_i is higher than a current maximum frequency ratio (step S38).

When frequency ratio R_i is equal to or lower than the current maximum frequency ratio (NO in step S38), start-up device 60 performs step S42 which will be described later. When frequency ratio R_i is higher than the current maximum frequency ratio (YES in step S38), start-up device 60 sets power converter 2_i as the candidate converter to be started up and sets the maximum frequency ratio to frequency ratio R_i (step S40).

Start-up device 60 determines whether or not a condition of i=n is satisfied (step S42). When the condition of i=n is not satisfied (NO in step S42), start-up device 60 performs processing in step S34. When the condition of i=n is satisfied (YES in step S42), start-up device 60 transmits the start-up command to control device 3 corresponding to the candidate converter (step S44) and quits the process.

According to the above, start-up device 60 selects, as AC system 12 that satisfies the defined condition, AC system 12 having the maximum frequency ratio among the plurality of AC systems 12 connected to the plurality of power converters 2 to be started up, respectively. Start-up device 60 transmits the start-up command to control device 3 of power converter 2 connected to selected AC system 12. Since power converter 2 connected to AC system 12 highest in power supply capability is thus started up, influence on AC system 12 can be lessened.

<Voltage>

An example in which a voltage and a short-circuit capacity of AC system 12 are employed as the system information of AC system 12 will be described. Start-up device 60 receives a current RMS voltage detected in each of AC systems 12_1 to 12_n, a reference RMS voltage (which is also referred to as a "reference voltage" below) of each of AC systems 12_1 to 12_n, and a short-circuit capacity of each of AC systems 12_1 to 12_n from each control device 3. Start-up device 60 starts up power converter 2 in accordance with the short-circuit capacity of each AC system 12, based on the RMS voltage or a voltage difference between the RMS voltage and the reference voltage. Specific description will be given below.

Figure 7:
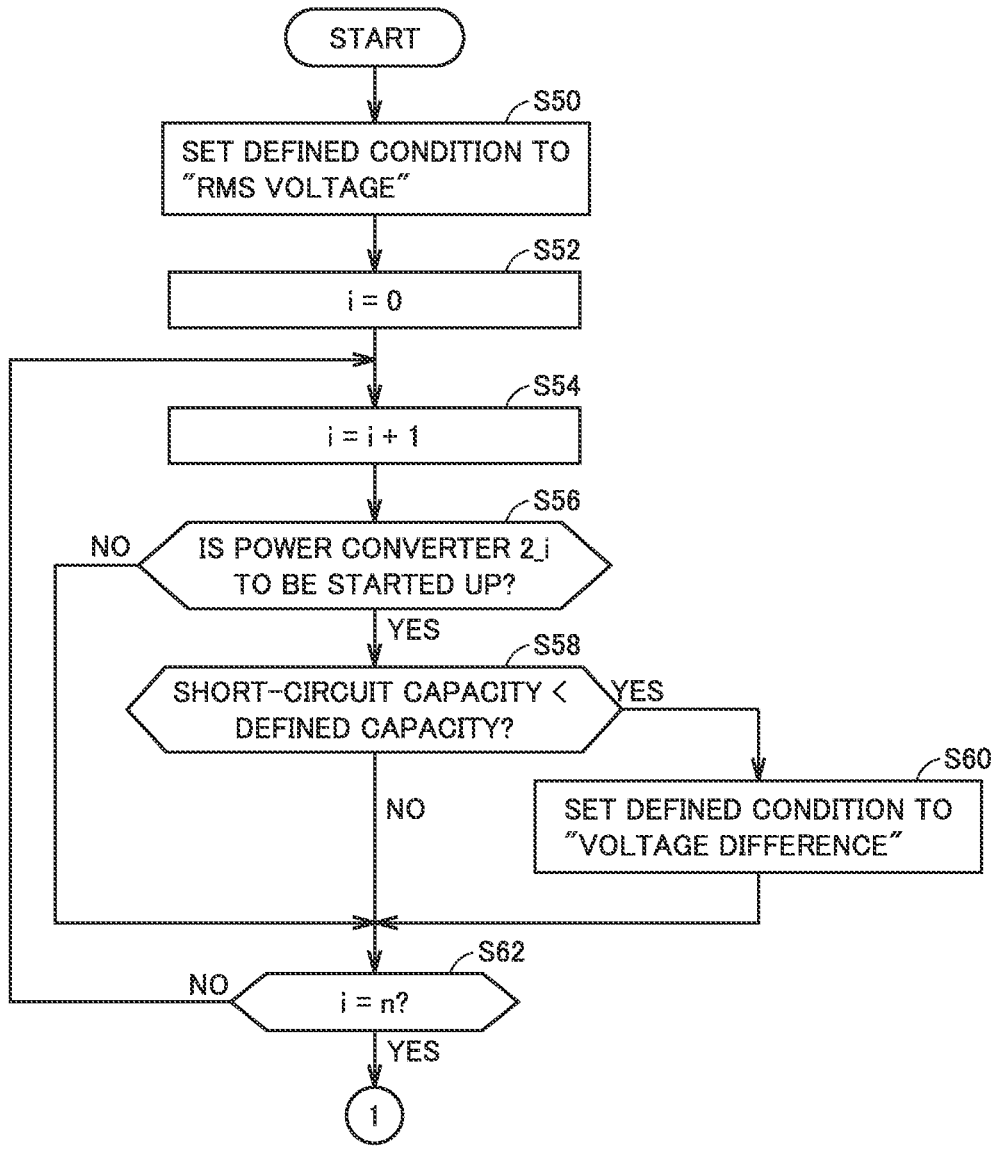
FIG. 7 is a flowchart for illustrating an exemplary method of starting up a power converter based on a voltage of an AC system.
Figure 8:
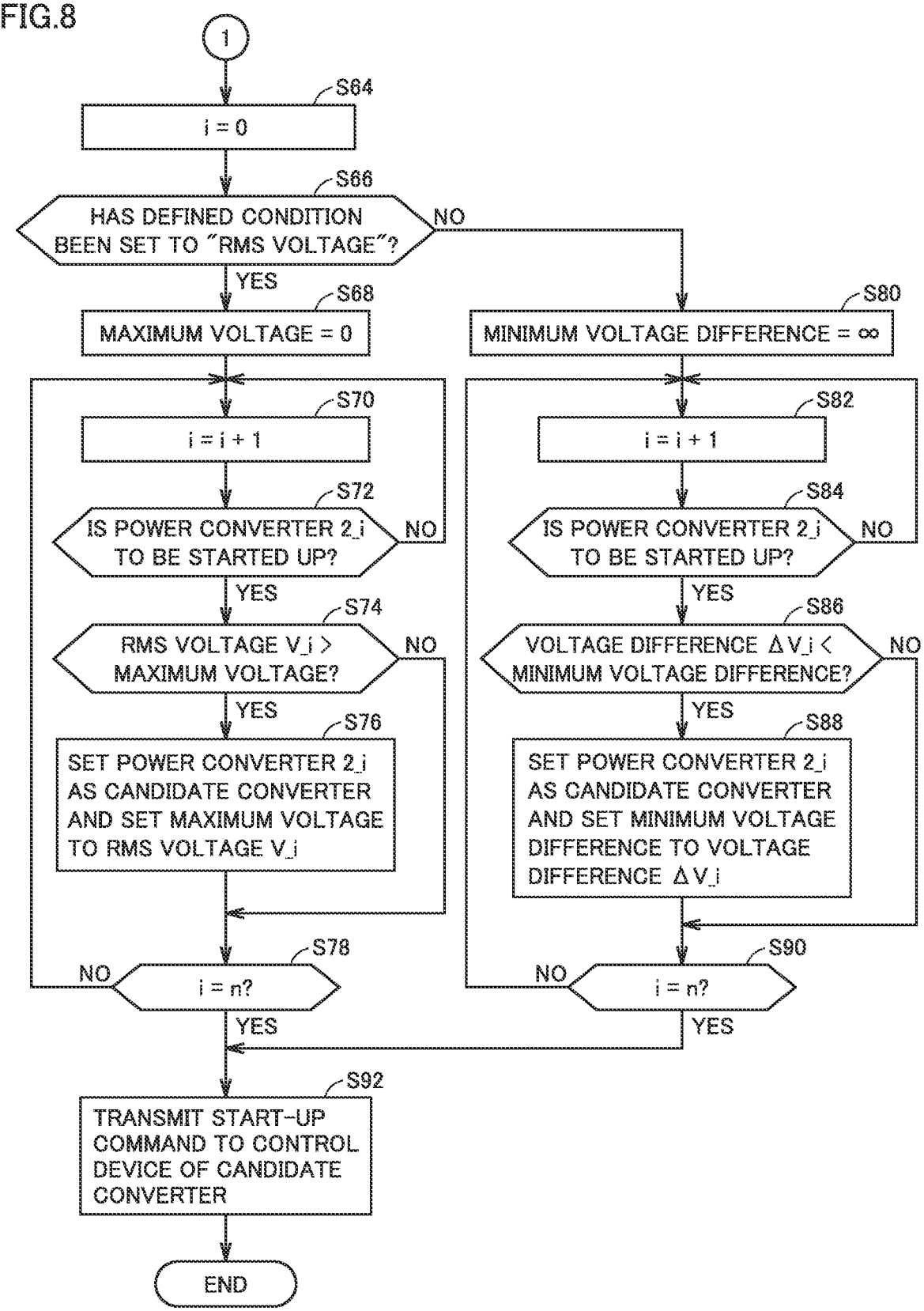
FIG. 8 is a flowchart for illustrating an exemplary method of starting up a power converter based on a voltage of an AC system.

FIGS. 7 and 8 are each a flowchart for illustrating an exemplary method of starting up power converter 2 based on a voltage of an AC system. Referring to FIG. 7, start-up device 60 sets the defined condition in selection of AC system 12 high in power supply capability to a condition C1 relating to the "RMS voltage" of AC system 12 (step S50). Start-up device 60 initializes counter i to i=0 (step S52).

Start-up device 60 increments counter i (step S54) and determines whether or not ith power converter 2_i is the power converter to be started up (step S56). When power converter 2_i is not to be started up (NO in step S56), the start-up device performs processing in step S62 which will be described later. When power converter 2_i is to be started up (YES in step S56), start-up device 60 determines whether or not the short-circuit capacity of AC system 12_i connected to power converter 2_i is lower than a defined capacity (step S58).

When the short-circuit capacity of AC system 12_i is equal to or higher than the defined capacity (NO in step S58), start-up device 60 determines whether or not a condition of i=n is satisfied (step S62). When the condition of i=n is not satisfied (NO in step S62), start-up device 60 performs processing in step S54. When the condition of i=n is satisfied (YES in step S62), start-up device 60 performs processing in step S64 in FIG. 8. When the short-circuit capacity of AC system 12_i is lower than the defined capacity (YES in step S58), start-up device 60 sets the defined condition to a condition C2 relating to the "voltage difference" (step S60). Specifically, start-up device 60 sets condition C1 relating to the "RMS voltage" set in step S50 newly to condition C2 relating to the "voltage difference." Then, start-up device 60 performs processing in step S62.

As shown in the flowchart in FIG. 7, when the short-circuit capacities of the plurality of AC systems 12 connected to the plurality of power converters 2 to be started up, respectively, are all equal to or higher than the defined capacity, start-up device 60 sets the defined condition to condition C1 relating to the "RMS voltage." This is because a voltage is less likely to vary when the short-circuit capacity of AC system 12 is high. Specifically, when the short-circuit capacities of all AC systems 12 are relatively high and voltage variation thereof is less, an AC system higher in RMS voltage can be concluded as the AC system higher in power supply capability.

When at least one of the plurality of short-circuit capacities of the plurality of AC systems 12 is lower than the defined capacity, start-up device 60 sets the defined condition to condition C2 relating to the "voltage difference." This is because the voltage is likely to vary when the short-circuit capacity of AC system 12 is low and the voltage may become high due to a Ferranti phenomenon. Specifically, when the short-circuit capacity of AC system 12 is low and voltage variation is great, an AC system high in RMS voltage cannot be concluded as being high in stability. In this case, AC system 12 varying less in voltage (that is, less in voltage difference) can be concluded as the AC system higher in power supply capability.

Referring to FIG. 8, start-up device 60 initializes counter i to i=0 (step S64). Start-up device 60 determines whether or not it has set the defined condition to condition C1 relating to the "RMS voltage" (step S66). When the defined condition has not been set to condition C1 (that is, the defined condition has been set to condition C2) (NO in step S66), start-up device 60 performs processing in steps S80 to S90 which will be described later and sets a candidate converter to be started up based on the "voltage difference" of AC system 12.

When the defined condition has been set to condition C1 (YES in step S66), start-up device 60 performs processing in steps S68 to S78 and sets a candidate converter to be started up based on the "RMS voltage" of AC system 12. Processing in steps S68 to S78 and S92 will initially be described.

Start-up device 60 initializes a maximum RMS voltage (which is also referred to as a "maximum voltage" below) of AC system 12 to "0" (step S68). Start-up device 60 increments counter i (step S70) and determines whether or not ith power converter 2_i is the power converter to be started up (step S72). When power converter 2_i is not to be started up (NO in step S 72), start-up device 60 performs processing in step S70.

When power converter 2_i is to be started up (YES in step S72), start-up device 60 determines whether or not an RMS voltage V_i of AC system 12_i connected to power converter 2_i is higher than a current maximum voltage (step S74). When RMS voltage V_i is equal to or lower than the current maximum voltage (NO in step S74), start-up device 60 performs step S78 which will be described later. When RMS voltage V_i is higher than the current maximum voltage (YES in step S74), start-up device 60 sets power converter 2_i as the candidate converter to be started up and sets the maximum voltage to RMS voltage V_i (step S76).

Start-up device 60 determines whether or not a condition of i=n is satisfied (step S78). When the condition of i=n is not satisfied (NO in step S78), start-up device 60 performs processing in step S70. When the condition of i=n is satisfied (YES in step S78), start-up device 60 transmits the start-up command to control device 3 corresponding to the candidate converter (step S92) and quits the process.

Processing in steps S80 to S90 will now be described. Start-up device 60 initializes a minimum voltage difference of AC system 12 to "∞" (step S80). Start-up device 60 increments counter i (step S82) and determines whether or not power converter 2_i is the power converter to be started up (step S84). When power converter 2_i is not to be started up (NO in step S84), start-up device 60 performs processing in step S82.

When power converter 2_i is to be started up (YES in step S84), start-up device 60 determines whether or not a voltage difference ΔV_i in AC system 12_i connected to power converter 2_i is smaller than a current minimum voltage difference (step S86). When voltage difference ΔV_i is equal to or larger than the minimum voltage difference (NO in step S86), start-up device 60 performs step S90 which will be described later. When voltage difference ΔV_i is smaller than the current minimum voltage difference (YES in step S86), start-up device 60 sets power converter 2_i as the candidate converter to be started up and sets the minimum voltage difference to voltage difference ΔV_i (step S88).

Start-up device 60 determines whether or not a condition of i=n is satisfied (step S90). When the condition of i=n is not satisfied (NO in step S90), start-up device 60 performs processing in step S82. When the condition of i=n is satisfied (YES in step S90), start-up device 60 transmits the start-up command to control device 3 corresponding to the candidate converter (step S92) and quits the process.

According to the flowchart in FIG. 8, when the defined condition is set to condition C1, start-up device 60 selects, as AC system 12 that satisfies condition C1, AC system 12 having the maximum RMS voltage among the plurality of AC systems 12 connected to the plurality of power converters 2 to be started up, respectively. When the defined condition is set to condition C2, start-up device 60 selects, as AC system 12 that satisfies condition C2, AC system 12 having the minimum voltage difference among the plurality of AC systems 12. Start-up device 60 transmits the start-up command to control device 3 of power converter 2 connected to selected AC system 12.

Figure 9:
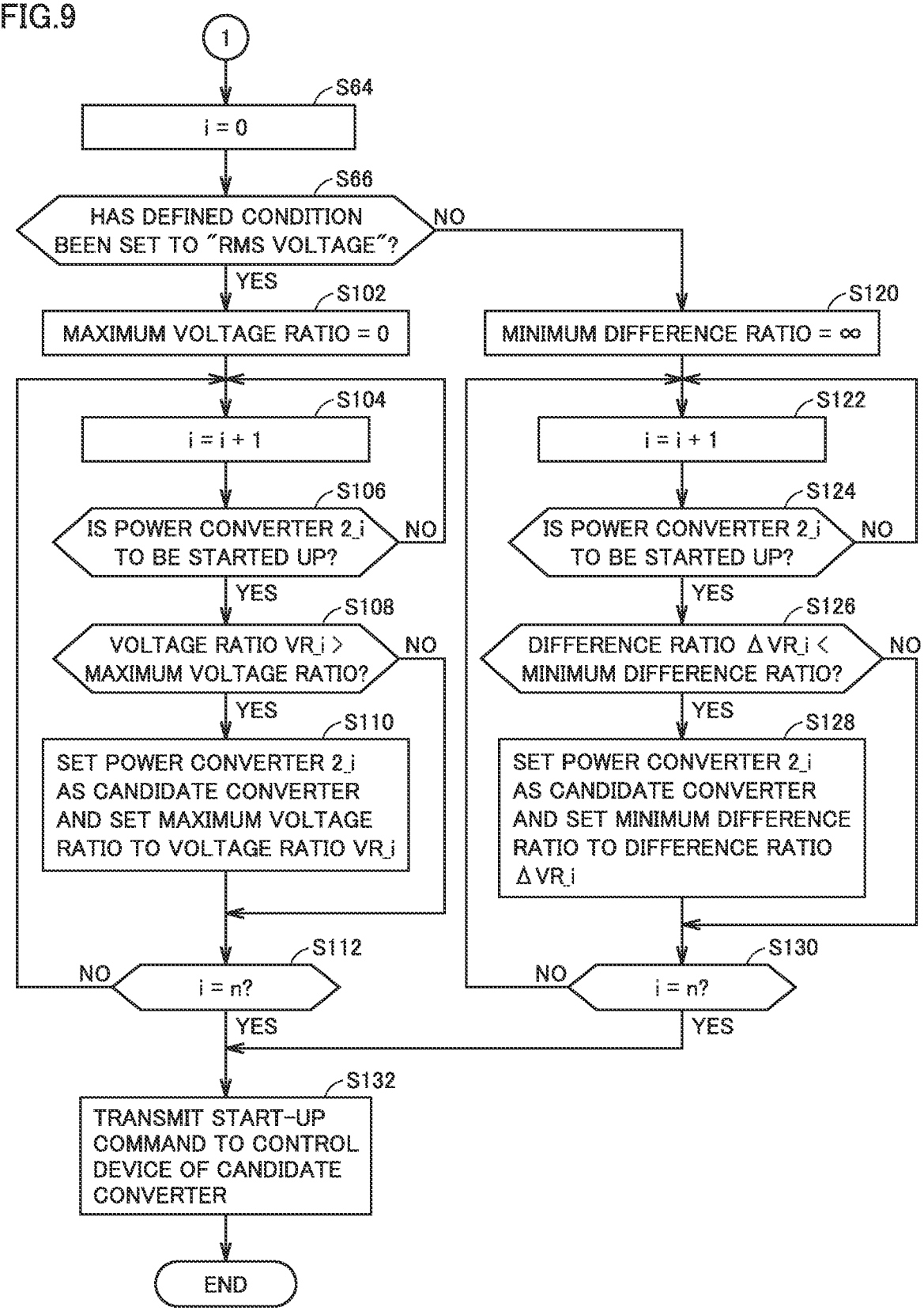
FIG. 9 is a flowchart for illustrating a modification of the method of starting up a power converter based on a voltage of an AC system.

A modification of the method of starting up power converter 2 based on conditions C1 and C2 will now be described. FIG. 9 is a flowchart for illustrating a modification of the method of starting up power converter 2 based on a voltage of an AC system. When condition C1 is adopted, start-up device 60 calculates, for each of the plurality of AC systems 12, a ratio (which is also referred to as a "voltage ratio" below) of the RMS voltage of AC system 12 to a reference voltage of AC system 12 and selects AC system 12 highest in voltage ratio. When condition C2 is adopted, start-up device 60 calculates, for each of the plurality of AC systems 12, a ratio (which is also referred to as a "difference ratio" below) of the voltage difference in AC system 12 to the reference voltage of AC system 12 and selects AC system 12 lowest in difference ratio.

Referring to FIG. 9, processing in steps S64 and S66 is similar to processing in FIG. 8. When the defined condition is not set to condition C1 (that is, the defined condition is set to condition C2) (NO in step S66), start-up device 60 performs processing in steps S120 to S130 which will be described later and sets a candidate converter to be started up based on the difference ratio of AC system 12.

When the defined condition is set to condition C1 (YES in step S66), start-up device 60 performs processing in steps S102 to S112 and sets a candidate converter to be started up based on the voltage ratio. Initially, processing in steps S102 to S112 and S132 will be described.

Start-up device 60 initializes a maximum voltage ratio of AC system 12 to "0" (step S102). Start-up device 60 increments counter i (step S104) and determines whether or not ith power converter 2_i is the power converter to be started up (step S106). When power converter 2_i is not to be started up (NO in step S106), start-up device 60 performs processing in step S104.

When power converter 2_i is to be started up (YES in step S106), start-up device 60 determines whether or not a voltage ratio VR_i in AC system 12_i connected to power converter 2_i is higher than a current maximum voltage ratio (step S108). When voltage ratio VR_i is equal to or lower than the current maximum voltage ratio (NO in step S108), start-up device 60 performs processing step S112 which will be described later. When voltage ratio VR_i is higher than the current maximum voltage ratio (YES in step S108), start-up device 60 sets power converter 2_i as a candidate converter to be started up and sets the maximum voltage ratio to voltage ratio VR_i (step S110).

Start-up device 60 determines whether or not a condition of i=n is satisfied (step S112). When the condition of i=n is not satisfied (NO in step S112), start-up device 60 performs processing in step S104. When the condition of i=n is satisfied (YES in step S112), start-up device 60 transmits the start-up command to control device 3 corresponding to the candidate converter (step S132) and quits the process.

Processing in steps 5120 to 5130 will now be described. Specifically, start-up device 60 initializes a minimum difference ratio of AC system 12 to "∞" (step S120). Start-up device 60 increments counter i (step S122) and determines whether or not power converter 2_i is the power converter to be started up (step S124). When power converter 2_i is not to be started up (NO in step S124), start-up device 60 performs processing in step S122.

When power converter 2_i is to be started up (YES in step S124), start-up device 60 determines whether or not a difference ratio ΔVR_i in AC system 12_i is lower than a current minimum difference ratio (step S126). When difference ratio ΔVR_i is equal to or higher than the minimum difference ratio (NO in step S126), start-up device 60 performs step S130 which will be described later. When difference ratio ΔVR_i is lower than the current minimum difference ratio (YES in step S126), start-up device 60 sets power converter 2_i as a candidate converter to be started up and sets the minimum difference ratio to difference ratio ΔVR_i (step S128).

Start-up device 60 determines whether or not a condition of i=n is satisfied (step S130). When the condition of i=n is not satisfied (NO in step S130), start-up device 60 performs processing in step S122. When the condition of i=n is satisfied (YES in step S130), start-up device 60 transmits the start-up command to control device 3 corresponding to the candidate converter (step S132) and quits the process.

According to the flowchart in FIG. 9, when the defined condition is set to condition C1, start-up device 60 selects, as AC system 12 that satisfies condition C1, AC system 12 having the maximum voltage ratio among the plurality of AC systems 12 connected to the plurality of power converters 2 to be started up, respectively. When the defined condition is set to condition C2, start-up device 60 selects, as AC system 12 that satisfies condition C2, AC system 12 having the minimum difference ratio among the plurality of AC systems 12. Start-up device 60 transmits the start-up command to control device 3 of power converter 2 connected to selected AC system 12.

Through processing in FIGS. 7 to 9, start-up device 60 can appropriately select AC system 12 highest in power supply capability in accordance with the short-circuit capacity of the plurality of AC systems 12 connected to the plurality of power converters 2 to be started up, respectively. Since power converter 2 connected to AC system 12 highest in power supply capability is thus started up, influence on AC system 12 can be minimized.

(Short-Circuit Capacity)

An example in which the short-circuit capacity of AC system 12 is employed as the system information of AC system 12 will be described. Since voltage variation is less when the short-circuit capacity of AC system 12 is high, an AC system higher in short-circuit capacity can be concluded as the AC system higher in power supply capability. It is assumed that the short-circuit capacity of each AC system 12 is stored in advance in the memory (for example, the ROM, the RAM, or a hard disk) of start-up device 60. The short-circuit capacity of each AC system 12 stored in the memory may be updated at any time by a system operator.

The method of starting up power converter 2 based on the short-circuit capacity of each AC system 12 is similar to the start-up method shown in FIG. 5. Specifically, start-up device 60 performs step S10 in FIG. 5. Start-up device 60 initializes a maximum short-circuit capacity of AC system 12 to "0" instead of step S12 and performs steps S14 and S16. Start-up device 60 determines whether or not a short-circuit capacity SC_i of AC system 12_i connected to power converter 2_i is higher than a current maximum short-circuit capacity, instead of step S18.

When short-circuit capacity SC_i is equal to or lower than the current maximum short-circuit capacity, start-up device 60 performs step S22. When short-circuit capacity SC_i is higher than the current maximum short-circuit capacity, start-up device 60 sets power converter 2_i as a candidate converter to be started up and sets the maximum short-circuit capacity to short-circuit capacity SC_i instead of step S20, and performs step S22. When the condition of i=n is not satisfied (NO in step S22), start-up device 60 performs processing in step S14. When the condition of i=n is satisfied (YES in step S22), start-up device 60 transmits the start-up command to control device 3 corresponding to the candidate converter (step S24) and quits the process.

According to the above, start-up device 60 selects, as AC system 12 that satisfies the defined condition, AC system 12 having the maximum short-circuit capacity among the plurality of AC systems 12, and starts up power converter 2 connected to selected AC system 12. Since power converter 2 connected to AC system 12 highest in short-circuit capacity is started up, influence on AC system 12 can be minimized.

(System Capacity)

An example in which a system capacity of AC system 12 is employed as the system information of AC system 12 will be described. The system capacity of AC system 12 refers to a summed value (which is also referred to as a "summed capacity" below) of capacities of one or more generators connected to AC system 12.

When the summed capacity (that is, the system capacity of AC system 12) of one or more generators connected to AC system 12 is high, voltage variation is less. Therefore, an AC system higher in system capacity can be concluded as the AC system higher in power supply capability. The system capacity of each AC system 12 is stored in advance in the memory in start-up device 60. The system capacity of each AC system 12 stored in the memory may be updated at any time by a system operator.

The method of starting up power converter 2 based on the system capacity of each AC system 12 is a start-up method resulting from replacement of the "short-circuit capacity" with the "system capacity" in the start-up method based on the short-circuit capacity described above. Specifically, start-up device 60 selects, as the AC system that satisfies the defined condition, an AC system having a maximum system capacity among the plurality of AC systems 12, and starts up power converter 2 connected to selected AC system 12. Since power converter 2 connected to AC system 12 highest in system capacity is started up, influence on AC system 12 can be minimized.

(Frequency Characteristic Constant)

An example in which a frequency characteristic constant of AC system 12 is employed as the system information of AC system 12 will be described. The frequency characteristic constant of AC system 12 is expressed as "$\Delta P/\Delta f$" where $\Delta f$ represents a frequency variation value which is a value of variation of a frequency F of power converter 2 connected to AC system 12 and $\Delta P$ represents an effective power variation value which is a value of variation of effective power output P.

When the frequency characteristic constant of AC system 12 is small, frequency variation is suppressed in spite of change in effective power. Therefore, an AC system smaller in frequency characteristic constant can be concluded as the AC system higher in power supply capability. The frequency characteristic constant of each AC system 12 is stored in advance in the memory in start-up device 60. The frequency characteristic constant of each AC system 12 stored in the memory may be updated at any time by a system operator.

The method of starting up power converter 2 based on the frequency characteristic constant of each AC system 12 is similar to processing in steps S80 to S92 performed in the example in FIG. 8 where condition C2 is adopted. Specifically, start-up device 60 performs step S64 in FIG. 8. Then, start-up device 60 initializes a minimum frequency characteristic constant to "∞" instead of step S80 and performs steps S82 and S84. Start-up device 60 determines whether or not a frequency characteristic constant K_i of AC system 12_i connected to power converter 2_i is smaller than a current minimum frequency characteristic constant, instead of step S86.

When frequency characteristic constant K_i is equal to or larger than the minimum frequency characteristic constant, start-up device 60 performs step S90. When frequency characteristic constant K_i is smaller than the minimum frequency characteristic constant, start-up device 60 sets power converter 2_i as a candidate converter to be started up and sets the minimum frequency characteristic constant to frequency characteristic constant K_i instead of step S88, and performs step S90. When the condition of i=n is not satisfied (NO in step S90), start-up device 60 performs processing in step S82. When the condition of i=n is satisfied (YES in step S90), start-up device 60 transmits the start-up command to control device 3 corresponding to the candidate converter (step S92) and quits the process.

According to the above, start-up device 60 selects, as the AC system that satisfies the defined condition, the AC system having the smallest frequency characteristic constant among the plurality of AC systems 12, and starts up power converter 2 connected to selected AC system 12. Since power converter 2 connected to AC system 12 smallest in frequency characteristic constant is started up, influence on AC system 12 can be minimized.

OTHER EMBODIMENTS (1) In the embodiment described above, a configuration in which one AC system 12 highest in power supply capability is selected and power converter 2 connected to selected AC system 12 is started up first is described. A plurality of AC systems 12 high in power supply capability, however, may be selected and a plurality of power converters 2 connected to selected AC systems 12, respectively, may be started up first.

Though a configuration in which start-up device 60 selects AC system 12 highest in frequency as AC system 12 that satisfies the defined condition is described with reference to the flowchart in FIG. 5, the configuration is not limited as such. For example, start-up device 60 may select one or more AC systems 12 having a frequency equal to or higher than a threshold value Th1 among the plurality of AC systems 12 as the AC system(s) that satisfies (satisfy) the defined condition. In this case, start-up device 60 transmits the start-up command to control device 3 of power converter 2 connected to each of the one or more selected AC systems 12. Start-up device 60 may select Ma AC systems 12 in the descending order of the frequency among the plurality of AC systems 12 as the AC systems that satisfy the defined condition. In this case, start-up device 60 transmits the start-up command to control device 3 of power converter 2 connected to each of the Ma selected AC systems 12.

Though a configuration in which start-up device 60 selects AC system 12 highest in frequency ratio as AC system 12 that satisfies the defined condition is described with reference to the flowchart in FIG. 6, the configuration is not limited as such. For example, start-up device 60 may select one or more AC systems 12 having a frequency ratio equal to or higher than a threshold value Th2 among the plurality of AC systems 12 as AC system(s) 12 that satisfies (satisfy) the defined condition. Alternatively, start-up device 60 may select Mb AC systems 12 in the descending order of the frequency ratio among the plurality of AC systems 12 as AC systems 12 that satisfy the defined condition.

Though a configuration in which AC system 12 highest in RMS voltage is selected when condition C1 is adopted is described with reference to the flowchart in FIG. 8, the configuration is not limited as such. For example, start-up device 60 may select one or more AC systems 12 having the RMS voltage equal to or higher than a threshold value Th3 among the plurality of AC systems 12 as the AC system(s) that satisfies (satisfy) condition C1. Start-up device 60 may select Mc AC systems 12 in the descending order of the RMS voltage among the plurality of AC systems 12 as the AC systems that satisfy condition C1.

Though a configuration in which AC system 12 smallest in voltage difference is selected when condition C2 is adopted is described with reference to the flowchart in FIG. 8, the configuration is not limited as such. For example, start-up device 60 may select one or more AC systems 12 having a voltage difference smaller than a threshold value Th4 among the plurality of AC systems 12 as the AC system(s) that satisfies (satisfy) condition C2. Start-up device 60 may select Md AC systems 12 in the ascending order of the voltage difference among the plurality of AC systems 12 as the AC systems that satisfy condition C2.

Though a configuration in which AC system 12 highest in voltage ratio is selected when condition C1 is adopted is described with reference to the flowchart in FIG. 9, the configuration is not limited as such. For example, start-up device 60 may select one or more AC systems 12 having a voltage ratio equal to or higher than a threshold value Th5 among the plurality of AC systems 12 as the AC system(s) that satisfies (satisfy) condition C1. Start-up device 60 may select Me AC systems 12 in the descending order of the voltage ratio among the plurality of AC systems 12 as the AC systems that satisfy condition C1.

Though a configuration in which AC system 12 lowest in difference ratio is selected when condition C2 is adopted is described with reference to the flowchart in FIG. 9, the configuration is not limited as such. For example, start-up device 60 may select one or more AC systems 12 having the difference ratio smaller than a threshold value Th6 among the plurality of AC systems 12 as the AC system(s) that satisfies (satisfy) condition C2. Start-up device 60 may select Mf AC systems 12 in the ascending order of the difference ratio among the plurality of AC systems 12 as the AC systems that satisfy condition C2.

Though a configuration in which start-up device 60 selects AC system 12 highest in short-circuit capacity as AC system 12 that satisfies the defined condition is described, the configuration is not limited as such. Start-up device 60 may select one or more AC systems 12 having the short-circuit capacity equal to or higher than a threshold value Th7 among the plurality of AC systems 12 as the AC system(s) that satisfies (satisfy) the defined condition. Alternatively, start-up device 60 may select Mg AC systems 12 in the descending order of the short-circuit capacity among the plurality of AC systems 12 as the AC systems that satisfy the defined condition.

Though a configuration in which start-up device 60 selects AC system 12 highest in system capacity as AC system 12 that satisfies the defined condition is described, the configuration is not limited as such. Start-up device 60 may select one or more AC systems 12 having a system capacity equal to or higher than a threshold value Th8 among the plurality of AC systems 12 as the AC system(s) that satisfies (satisfy) the defined condition. Alternatively, start-up device 60 may select Mh AC systems 12 in the descending order of the system capacity among the plurality of AC systems 12 as the AC systems that satisfy the defined condition.

Though a configuration in which start-up device 60 selects AC system 12 smallest in frequency characteristic constant as AC system 12 that satisfies the defined condition is described, the configuration is not limited as such. Start-up device 60 may select one or more AC systems 12 having a frequency characteristic constant smaller than a threshold value Th9 among the plurality of AC systems 12 as the AC system(s) that satisfies (satisfy) the defined condition. Alternatively, start-up device 60 may select Mi AC systems 12 in the ascending order of the frequency characteristic constant among the plurality of AC systems 12 as the AC systems that satisfy the defined condition.

(2) In the embodiment described above, though a configuration in which start-up device 60 obtains system information by receiving a frequency and a voltage of AC system 12 from control device 3 is described, the configuration is not limited as such. For example, start-up device 60 may be configured to calculate system information by receiving a frequency and a voltage from each detector provided in each AC system 12.

(3) After power converter 2 is started up with the start-up method described in the embodiments above, remaining power converters 2 that have not been started up may be started up in accordance with the start-up method described above. Alternatively, power converter 2 determined as appropriate by a system operator may be configured to be started up.

(4) The configuration exemplified in the embodiments described above represents an exemplary configuration in the present disclosure, and it can be combined with another known technique or can be modified, for example, partially be omitted, within the scope not departing from the gist of the present disclosure. In the embodiments described above, the processing and the configuration described in other embodiments may be adopted and carried out as appropriate.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST

2 power converter; 3 control device; 4*u*, 4*v*, 4*w* leg circuit; 5 upper arm; 6 lower arm; 7 sub module; 8A, 8B reactor; 9A, 9B arm current detector; 10 power conversion device; 11A, 11B DC voltage detector; 12 AC system; 13 transformer; 14 DC circuit; 16 AC current detector; 18 AC voltage detector; 31*n*1, 31*n*2, 31*n*, 31*p*, 31*p*1, 31*p*2 switching element; 32 condenser; 33 voltage detector; 34 bypass switch; 51 auxiliary transformer; 52 AD conversion unit; 60 start-up device; 70 arithmetic processing unit; 71 bus; 72 CPU; 73 ROM; 74 RAM; 75 DI circuit; 76 DO circuit; 77 input interface; 78 communication interface; 100 power conversion system

The invention claimed is:

1. A power conversion system comprising:
a plurality of power conversion devices connected to a plurality of AC systems, respectively, the power conversion devices being further connected to a common DC circuit; and
a start-up device to start up each of the power conversion devices, wherein
the start-up device
selects an AC system that satisfies a defined condition relating to power supply capability from among the plurality of AC systems based on system information of the plurality of AC systems, and
starts up a power conversion device connected to the selected AC system,
the system information of the AC system includes an RMS voltage of the AC system, a voltage difference between the RMS voltage of the AC system and a reference RMS voltage, and a short-circuit capacity of the AC system, and
the start-up device
sets the defined condition to a first condition relating to the RMS voltage when the short-circuit capacity of each of the plurality of AC systems is equal to or higher than a defined capacity, and
sets the defined condition to a second condition relating to the voltage difference when at least one of a plurality of short-circuit capacities of the plurality of AC systems is lower than the defined capacity.

2. The power conversion system according to claim 1, wherein
when the defined condition is set to the first condition, the start-up device selects, as the AC system that satisfies the first condition, an AC system having a maximum RMS voltage among the plurality of AC systems or an AC system having the RMS voltage equal to or higher than a first threshold value among the plurality of AC systems.

3. The power conversion system according to claim 2, wherein
when the defined condition is set to the second condition, the start-up device selects, as the AC system that satisfies the second condition, an AC system having a minimum voltage difference among the plurality of AC systems or an AC system having the voltage difference smaller than a second threshold value among the plurality of AC systems.

4. The power conversion system according to claim 2, wherein
the power conversion device includes a modular multi-level conversion power converter.

5. The power conversion system according to claim 2, wherein
the power conversion device includes a modular multi-level conversion power converter.

6. The power conversion system according to claim 1, wherein
when the defined condition is set to the second condition, the start-up device selects, as the AC system that satisfies the second condition, an AC system having a minimum voltage difference among the plurality of AC systems or an AC system having the voltage difference smaller than a second threshold value among the plurality of AC systems.

7. The power conversion system according to claim 1, wherein when the defined condition is set to the first condition, the start-up device calculates, for each of the plurality of AC systems, a first ratio of the RMS voltage of the AC system to the reference RMS voltage of the AC system, and selects, as the AC system that satisfies the first condition, an AC system having a maximum first ratio among the plurality of AC systems or an AC system having the first ratio equal to or higher than a third threshold value among the plurality of AC systems.

8. The power conversion system according to claim 7, wherein when the defined condition is set to the second condition, the start-up device calculates, for each of the plurality of AC systems, a second ratio of the voltage difference in the AC system to the reference RMS voltage of the AC system, and selects, as the AC system that satisfies the second condition, an AC system having a minimum second ratio among the plurality of AC systems or an AC system having the second ratio lower than a fourth threshold value among the plurality of AC systems.

9. The power conversion system according to claim 7, wherein the power conversion device includes a modular multi-level conversion power converter.

10. The power conversion system according to claim 1, wherein when the defined condition is set to the second condition, the start-up device calculates, for each of the plurality of AC systems, a second ratio of the voltage difference in the AC system to the reference RMS voltage of the AC system, and selects, as the AC system that satisfies the second condition, an AC system having a minimum second ratio among the plurality of AC systems or an AC system having the second ratio lower than a fourth threshold value among the plurality of AC systems.

11. The power conversion system according to claim 8, wherein the power conversion device includes a modular multi-level conversion power converter.

12. The power conversion system according to claim 1, wherein the power conversion device includes a modular multi-level conversion power converter.

13. A power conversion system comprising:

a plurality of power conversion devices connected to a plurality of AC systems, respectively, the power conversion devices being further connected to a common DC circuit; and a start-up device to start up each of the power conversion devices, wherein the start-up device selects an AC system that satisfies a defined condition relating to power supply capability from among the plurality of AC systems based on system information of the plurality of AC systems, and starts up a power conversion device connected to the selected AC system, each of pieces of the system information is a short-circuit capacity of each of the AC systems, and the start-up device selects, as the AC system that satisfies the defined condition, an AC system having a maximum short-circuit capacity among the plurality of AC systems or an AC system having the short-circuit capacity equal to or higher than a threshold value among the plurality of AC systems.

14. The power conversion system according to claim 13, wherein the power conversion device includes a modular multi-level conversion power converter.

15. A power conversion system comprising:

a plurality of power conversion devices connected to a plurality of AC systems, respectively, the power conversion devices being further connected to a common DC circuit; and a start-up device to start up each of the power conversion devices, wherein the start-up device selects an AC system that satisfies a defined condition relating to power supply capability from among the plurality of AC systems based on system information of the plurality of AC systems, and starts up a power conversion device connected to the selected AC system, each of pieces of the system information is a system capacity of each of the AC systems, the system capacity of the AC system is a summed capacity of one or more generators connected to the AC system, and the start-up device selects, as the AC system that satisfies the defined condition, an AC system having a maximum system capacity among the plurality of AC systems or an AC system having the system capacity equal to or higher than a threshold value among the plurality of AC systems.

16. The power conversion system according to claim 15, wherein the power conversion device includes a modular multi-level conversion power converter.

* * * * *